(12) United States Patent
Forissier et al.

(10) Patent No.: US 7,936,763 B2
(45) Date of Patent: *May 3, 2011

(54) METHOD AND APPARATUS FOR LOAD-BALANCING IN A DISTRIBUTED PROCESSING SYSTEM

(75) Inventors: Jerome Forissier, Juan les Pins (FR); Richard Gayraud, Antibes (FR); Marc Lamberton, Antibes (FR); David Mansutti, Valbonne (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 895 days.

This patent is subject to a terminal disclaimer.

(21) Appl. No.: 10/557,405

(22) PCT Filed: May 18, 2004

(86) PCT No.: PCT/EP2004/005487
§ 371 (c)(1),
(2), (4) Date: Sep. 6, 2006

(87) PCT Pub. No.: WO2004/105341
PCT Pub. Date: Dec. 2, 2004

(65) Prior Publication Data
US 2007/0058533 A1    Mar. 15, 2007

(30) Foreign Application Priority Data
May 20, 2003   (EP) .................................. 03291191

(51) Int. Cl.
*H04L 12/28* (2006.01)

(52) U.S. Cl. ..................................... 370/395.3; 370/401
(58) Field of Classification Search .................. None
See application file for complete search history.

(56) References Cited

U.S. PATENT DOCUMENTS

| | | | |
|---|---|---|---|
| 5,924,097 A | 7/1999 | Hill et al. | 707/10 |
| 6,272,136 B1 * | 8/2001 | Lin et al. | 370/392 |
| 6,345,303 B1 | 2/2002 | Knauerhase et al. | 709/238 |
| 6,990,101 B1 * | 1/2006 | Chow et al. | 370/392 |
| 7,366,755 B1 * | 4/2008 | Cuomo et al. | 709/204 |
| 2002/0073203 A1 * | 6/2002 | Gilleland | 709/227 |
| 2002/0174034 A1 * | 11/2002 | Au et al. | 705/27 |
| 2003/0093462 A1 | 5/2003 | Koskelainen et al. | 709/203 |
| 2003/0097405 A1 * | 5/2003 | Laux et al. | 709/203 |
| 2003/0108052 A1 * | 6/2003 | Inoue et al. | 370/399 |
| 2004/0152469 A1 * | 8/2004 | Yla-Outinen et al. | 455/453 |

* cited by examiner

*Primary Examiner* — Chirag G Shah
*Assistant Examiner* — Daniel Mitchell

(57) ABSTRACT

According to an embodiment of the present invention, there is provided a method of routing a message to one of a plurality of available processing systems, comprising the steps of detecting the presence of a destination identifier in the message, and where the presence of the destination identifier is detected, forwarding the message to the processing system identified thereby. Where the presence of the destination field is not detected the steps of determining a destination processing system for processing the message, inserting into the message a destination identifier identifying the determined destination processing system, and forwarding the message to the determined processing system may be performed.

22 Claims, 5 Drawing Sheets

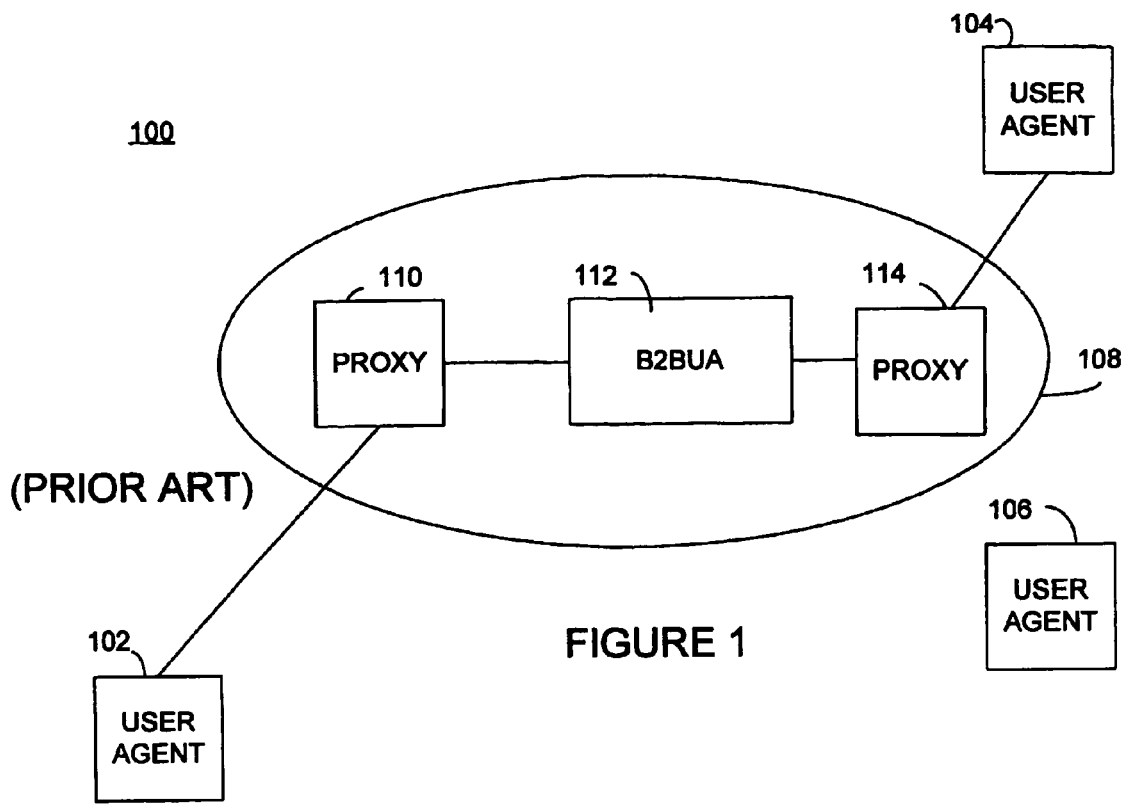

METHOD AND APPARATUS FOR LOAD-BALANCING IN A DISTRIBUTED PROCESSING SYSTEM

The present invention relates to the field of distributed processing systems and, more particularly, to improvements in load-balancing systems and methods.

Increasingly network-based services and applications are accessed via some kind of load-balancing arrangement. For example, when a network-based service has a large number of concurrent users, load-balancing enables the processing load to be distributed among multiple backend servers or applications. Should the number of users increase over time, additional backend servers may be added to cope with the increased load, completely transparently to the user. A load-balancer may, for example, receive all requests to a network-based service, and forward the requests to an appropriate backend server based on the load or some other parameter of the system. One advantage of using load-balancers is that services may be provided is with a single externally visible address.

Many types of network service, for example those using hypertext transfer protocol (HTTP) over the Internet, use a simple request and response mechanism. For example, an Internet browser sends a HTTP request to an application, and the application responds with a HTTP response. The application address is typically the address of a load-balancer which then routes the request to an available server based, for example, on the current workload of the available servers. In many such situations, all requests may be treated independently of all other requests—including successive requests coming from the same user. In such cases, there is typically no requirement that different requests from the same user be processed by the same backend server. In other words, the requests are effectively contextless and do not require the load-balancer to have any previous knowledge of any previous requests in order to determine to which backend server to forward the message.

In other situations, context information must be maintained by the load-balancer in order to determine to which backend server a message should be forwarded to. For example, In telecommunication networks, multiple messages may be sent to and from a terminal to establish a call with another party. It is thus generally important that different messages related to the same call be processed by the same server.

For example, when establishing a telephone call it is typically desirable that all messages relating to the call establishment are processed by the same backend server. This type of functionality is commonly referred to as server affinity.

In order to provide server affinity a load-balancer is required to store some context information, for example the call ID of each message, and to check each received message to determine whether that call ID is already being processed by a given server, to thereby ensure that subsequent messages having the same call ID are processed by the same backend server. This is typically achieved by maintaining a database of current calls IDs and backend servers processing messages relating to each call ID. Aspects of traditional telephony systems typically function in this way.

In traditional telephony applications server affinity may only be required during the establishment of a call, which typically only lasts for a few seconds. Thus, once a call has been established, the load-balancer can remove all references to that call ID, freeing up space in the database.

However many other systems, including some of the new telephony protocols, such as the session initiation protocol (SIP), function in sufficiently different ways that the conventional load-balancing approach is no longer suitably adapted.

SIP is an application-layer control or signaling protocol for establishing, modifying, and terminating real-time calls and conferences over, primarily, Internet protocol (IP) networks. At its simplest, a call setup in SIP requires two transactions: one to setup a call; and one to release the call. A SIP transaction typically only lasts a few seconds, whereas a SIP call is theoretically unbounded. Due to the nature of SIP, where, for example, call legs may be added to a current call, media types may be changed at any time, and so on, it is generally required that SIP messages belonging to the same call be processed by the same backend server.

Traditional load-balancing approaches, such as maintaining a database of context information for all active calls at a load-balancer, may therefore, not be suitably adapted for use with SIP for a number of reasons. Firstly, since the length of a SIP call is theoretically unbounded and the fact that the load-balancer must store call context information for the duration of each and every the call, it is possible that the load-balancer may become overwhelmed, especially if the number of simultaneous calls and the number of backend servers is large. Additionally, in order to clean up the stored context information, the load-balancer may be required to receive all incoming and outgoing SIP messages to determine when a call has finished in order to be able to remove the stored context information for that call when it is no longer required. These constraints may impact the performance capabilities of such a load-balancer and limit the message handling capabilities thereof.

Accordingly, one aim of the present invention is to provide a system which overcomes at least some of the above-mentioned problems.

According to a first aspect of the present invention, there is provided a method of routing a message to one of a plurality of available processing systems, comprising the steps of detecting the presence of a destination identifier in the message, and where the presence of the destination identifier is detected, forwarding the message to the processing system identified thereby. Where the presence of the destination field is not detected the further steps of determining a destination processing system for processing the message, inserting into the message a destination identifier identifying the determined destination processing system, and forwarding the message to the determined processing system may be performed.

Advantageously, this removes the need for a load-balancing element to maintain a database of all current calls being processed, thus reducing the processing load of the load-balancer. Furthermore, since the load-balancer no longer has to receive all messages sent from backend servers in order to know when to clean up the database, throughput of the load-balancer may be further increased.

Each message may further include a message identifier for identifying related messages in which case the method may further comprise maintaining a database of message identifiers for which no destination identifier was detected along with information indicating to which of the available processing systems each message was forwarded to.

Where a message is received without a destination identifier, the method may further comprise searching the database for a related message identifier and, where found, forwarding the message to the processing system identified therein.

In one embodiment each processing system is adapted for sending a response to the message originator via the load-balancer. Alternatively each processing system may be adapted for sending a response directly to the originator of the message.

Preferably entries are removed from the database after a predetermined amount of time.

The method may be used in conjunction with a session initiation protocol (SIP) based network.

The destination identifier are preferably inserted into an extension header of a SIP message.

When used in conjunction with a SIP network, the entries may be removed after 32 seconds.

In one embodiment the method may be adapted for use with the user datagram protocol (UDP).

In a further embodiment the method may be adapted for use with a load-balancing element.

According to a second aspect of the present invention, there is provided a load-balancing system for routing a message to one of a plurality of available processing systems. The system comprises a message analyzer for detecting the presence of a destination identifier in the received message, and a message forwarder for forwarding the message to the processing system identified by the detected identifier.

When the presence of a destination identifier is not detected the system may further comprise a load analyzer for determining a destination processing system for processing the message, and a message processor for inserting into the message a destination identifier identifying the determined destination processing system.

Each message may further include a message identifier for identifying related messages, in which case the system further comprises a database for storing details of message identifiers for which no destination identifier was detected along with information indicating to which of the available processing systems each message was forwarded to.

Where a message is received without a destination identifier the system further comprises means for searching the database for a related message Identifier and for identifying to which processing system the message should be forwarded.

In one embodiment each processing system is adapted for sending a response to the message originator via the load-balancer. In a further embodiment each processing system is adapted for sending a response directly to the originator of the message.

The load-balancing system may be adapted for use in a session initiation protocol (SIP) based network.

Preferably the database Is adapted to remove entries after a predetermined amount of time. In the case of SIP, the predetermined amount of time is preferably 32 seconds.

The message processor preferably inserts the destination identifier into an extension header of a SIP message.

The load-balancing system may be adapted for use with the user datagram protocol (UDP).

According to a further aspect of the present invention, there is provided a load-balancing element adapted for use with the herein described method.

The invention will now be described, by way of non-limiting example, with reference to the accompanying diagrams, in which:

FIG. 1 is a block diagram showing an overview of a simplified SIP network arrangement according to the prior art;

FIG. 2 is a block diagram showing a back to back user agent (B2BUA) according to the prior art;

Figure 3:
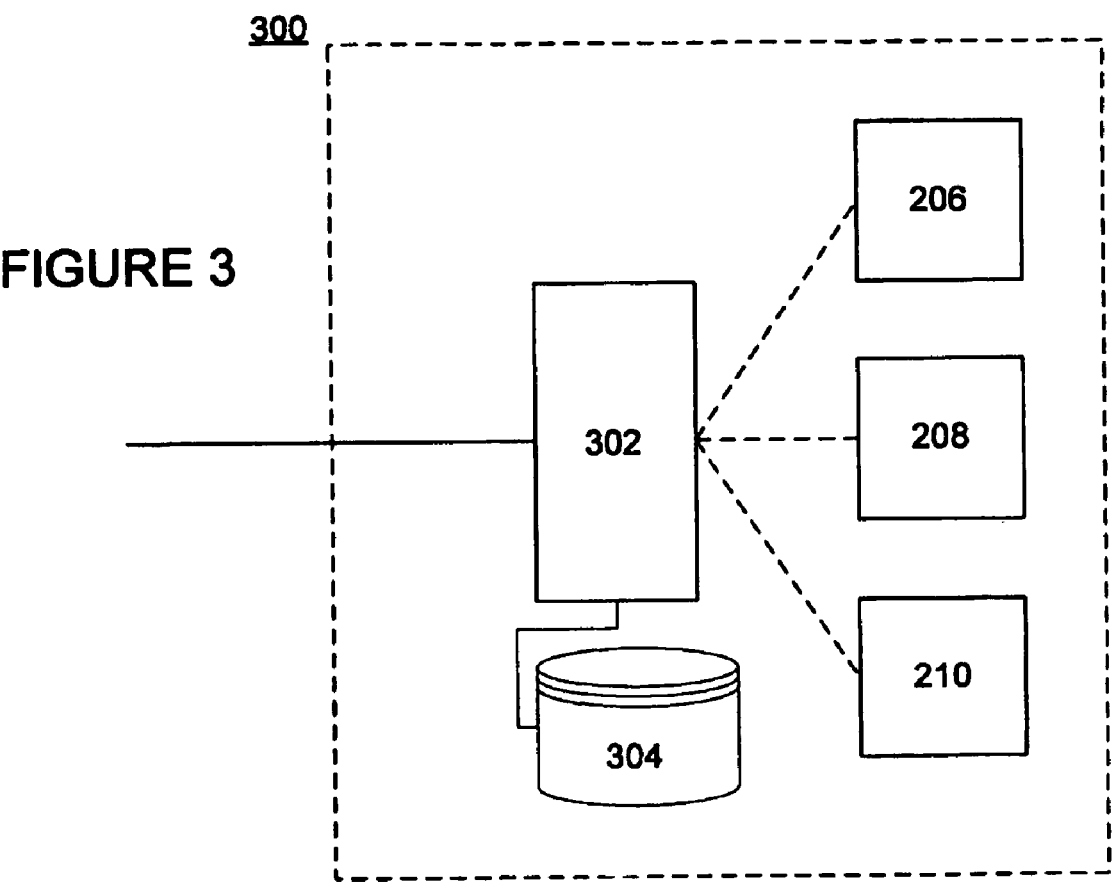
FIG. 3 is a block diagram showing an overview of a load-balancing system according to an embodiment of the present invention.

FIG. 1 is a block diagram showing an overview of a simplified SIP network arrangement 100 according to the prior art. A number of terminals, which may be SIP user agents, 102, 104 and 106 are shown. If a user agent 102 wishes to establish a call with a user agent 104, a SIP Invite message is sent to a SIP proxy server 110 in an IP network 108. The SIP proxy resolves the address of the user agent 104 and forwards the Invite message to a back-to-back user agent (B2BUA) 112. The B2BUA may be used, for example, to provide value added services, such as pre-paid billing or conferencing, in addition to the basic telephony/multimedia functionality provided by SIP. A further SIP proxy 114 is typically used to resolve the address of the user agent 104.

Typically the value add services mentioned above may be implemented in a distributed processing arrangement, as shown in FIG. 2 which shows a B2BUA 112 in accordance with the prior art. A load-balancer 202 is provided which receives all incoming messages sent to the B2BUA 112. As mentioned above, one of the advantages of using a load-balancer is that only a single external network address is seen by the network. The load-balancer 202 forwards each received message to one of a plurality of backend servers 206, 208, 210 which carry out the required processing operations. Such processing operations could include, for example, pre-paid billing, credit card authorizations, portal authentication and so on. The load-balancer 202 may determine which back-end server to use through use of any appropriate algorithm, such as least loaded, round-robin and so on. It will be appreciated that although the load-balancer and back-end servers are shown as being integral to the B2BUA 112, these elements may be located externally therefrom, for example in a distributed manner.

Since it is generally advantageous that all SIP messages relating to the same call are processed by the same backend server, the load-balancer 202 has to maintain a database 204 of all current SIP calls along with related call IDs and the backend server which is processing the call. Additionally, all messages sent from a backend server 206, 208 or 210 to a user agent, also pass through the load-balancer 202 so that the load-balancer can determine when a SIP call has terminated thereby allowing the load-balancer to clean up the database 204. As previously mentioned, due to the theoretically endless nature of a SIP call coupled with the large number of simultaneous calls which can be handled by the B2BUA 112, the database 204 has to be sufficiently large to handle data from the maximum number of simultaneous calls which the B2BUA 112 can support.

Figure 8:
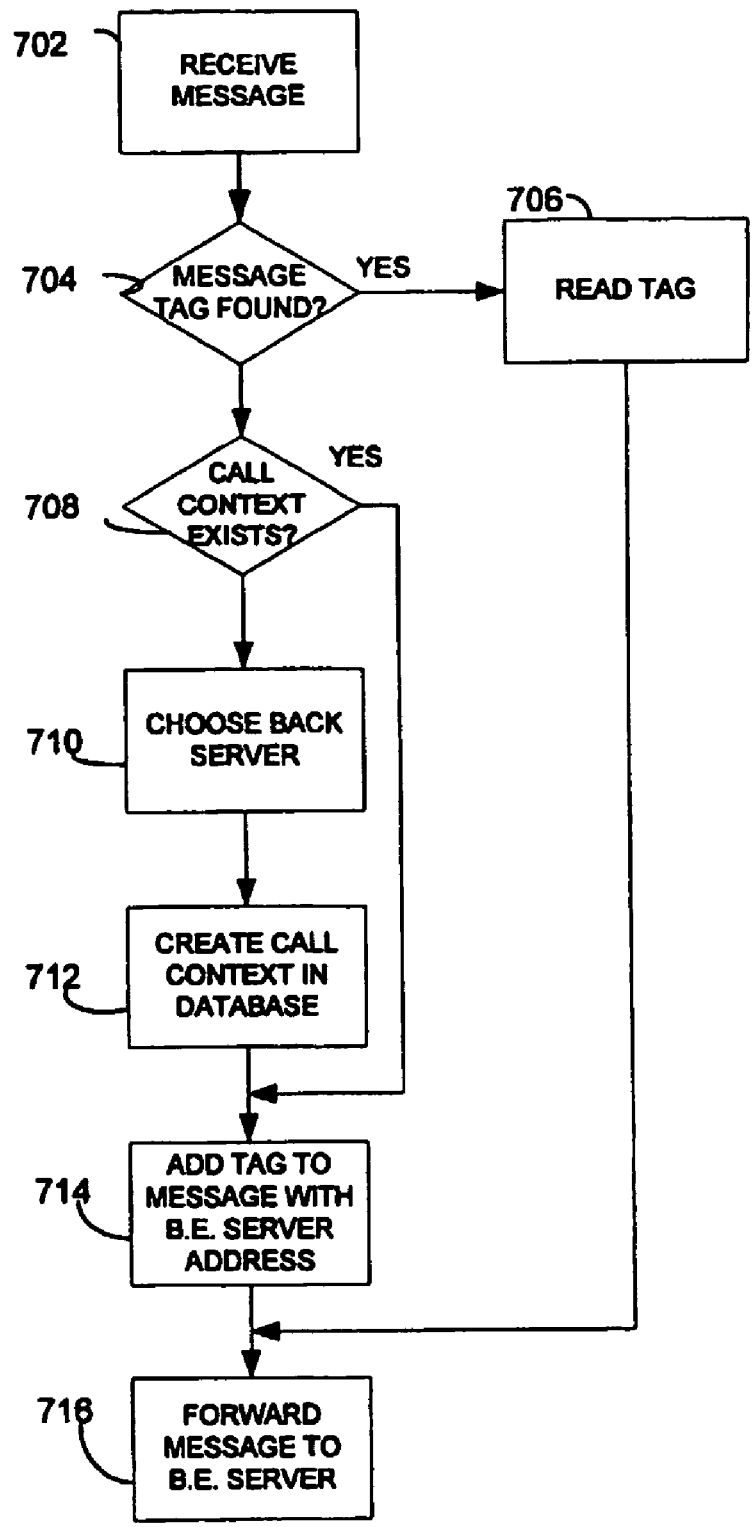
FIG. 8 is a flow diagram outlining example processing steps of a load-balancer operating in accordance with an embodiment of the present invention.

An embodiment of the invention will now be described with reference to FIG. 3 and FIG. 8. FIG. 3 is a block diagram showing an overview of a load-balancing system according to an embodiment of the present invention and FIG. 8 is a flow diagram outlining example processing steps which may made by the load-balancer 302 of FIG. 3. In the following description, for simplicity of explanation, some of the steps shown In FIG. 8 are Initially not discussed.

The system 300 may be, for example, a B2BUA, or other network or client/server element. A load-balancer 302 receives a message (step 702), for example a SIP INVITE message, from, for example, a SIP user agent 102. When a message arrives at the load-balancer relating to a new call, the load-balancer chooses (step 710) one of the available backend servers 206, 208 or 210 to send the message to using a suitable load-balancing algorithm, as will be appreciated by those skilled in the art. The load-balancer 302 inserts a tag in the SIP message (step 714), for example 'myTag', indicating the identity of the chosen backend server and forwards the message to the chosen backend server (step 716). Preferably the tag contains sufficient information to enable the load-balancer to route the message without requiring a further call context. Additionally, the tag is preferably inserted into the message such that the tag will be included in all future messages sent in response to the message. For example, In SIP the message may be suitably inserted as an extension header.

SIP provides for the retransmission of messages in the event that a response is not received within a predetermined amount of time. One problem that this can create is that if a backend server is slow to respond, or if an initial message is lost, for example, the SIP user agent may retransmit the same message. If this message happens to be the first message related to a call (i.e. there is no tag present), the load-balancer is likely to send this message to a different backend server than that dealing with the first message, which may lead to the system creating several call contexts in different backend servers for a single SIP call. This may result in protocol violations for example if identical responses are sent to a user agent client, or sub-optimal processing.

In order to prevent this, the load-balancer 302 preferably maintains a database 304 of all messages which relate to new calls. Thus, the following additional steps are performed. For example, when a message is received it is determined (Step 704) whether a previously inserted tag is present. If not, this indicates that the received message may relate to a new call. The database 304 is searched to determine whether a message with the same call identification is present In the database (step 708). If yes, then the message may be, for example, a retransmitted message or a CANCEL message sent shortly after an initial INVITE message, and is forwarded to the backend server indicated In the database once a suitable tag has been inserted in the message. If no message having the same call ID is found, this indicates that this is the first message relating to a call, in which case a suitable backend server is chosen to process the message (step 710). A call context is subsequently created in the database (step 712), a tag is added to the received message identifying the chosen backend server (step 714), and finally the message is forwarded to the chosen backend server.

After a predetermined amount of time from their creation in the database, 32 seconds in the case of SIP, entries in the databases may be deleted since after this time no further untagged messages relating to the same transaction may be accepted by the load-balancer. Advantageously, for example when user datagram protocol (UDP) is used as the transport protocol, the backend servers may respond directly to the SIP user agents, removing the need to pass through the load-balancer, thus further increasing the potential throughput of the load-balancer. This is possible since the load-balancer maintains no context information after a predetermined time, and therefore does not need to be informed when a call ends in order to clean-up the database.

As will be appreciated by those skilled in the art, the herein-described functionality performed by the load-balancer may be provided in a number of ways, for example, by way of software, by suitable electronic hardware, or a combination of both software and hardware. For example, the load-balancer 302 may comprise suitable logical or functional elements such as a message analyzer, for analyzing the messages to determine whether an inserted tag is present, a load analyzer, for determining to which back-end server a message should be processed by, a message processor, for Inserting identification tags into a message, and a message forwarder for forwarding a message to an appropriate back-end server. Such elements may be provided in various combinations.

A number of further embodiments will now be described with reference to the message flow diagrams of FIGS. 4 to 6.

Figure 4:
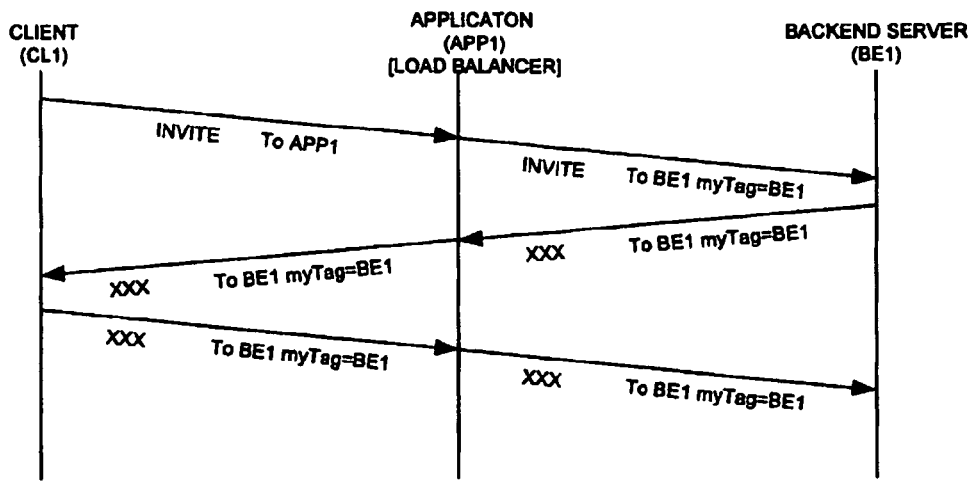
FIG. 4 is a message flow diagram illustrating a further embodiment.

As shown in FIG. 4, a SIP user agent (CL1) sends a SIP INVITE message to an application (APP1). As described above, the application is an application using a load-balancer and a number of distributed backend servers. When the load-balancer receives the INVITE message, it analyses the message to determine the presence of an inserted tag. If no tag is found, the load-balancer chooses a suitable backend server (BE1) and inserts a tag, for example myTag, Identifying the chosen backend. server into the message, and forwards the message to the chosen backend server. When the backend server sends a response message to the user agent the message passes first through the load-balancer 302 which forwards the message to the SIP user agent (CL1). If the SIP user agent sends a further message related to the same call, the previously inserted tag will be present in the message. When this message is received by the load-balancer 302 the message is examined to determine whether there is a tag present therein. If there is a tag present, the load-balancer forwards the message to the backend server indicated by the tag. In this way, the load-balancer does not need to store details of all current calls in order to determine which backend server should process a message and the requirement to store context information for all calls at the load-balancer is removed.

In this embodiment, no modifications are required to either the SIP user client or the backend servers, as the effect of inserting the tag is effectively transparent. Furthermore, in the event of a failure of a backend server, the load-balancer can forward the message to a backup server other than that indicated by the inserted tag, without the SIP user agent ever being aware that a failure occurred.

Figure 5:
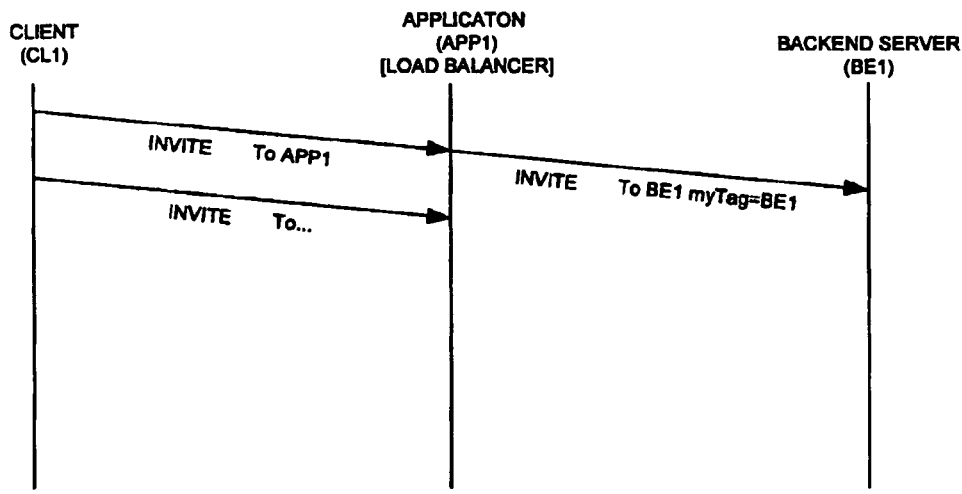
FIG. 5 is a message flow diagram illustrating a further embodiment.
Figure 6:
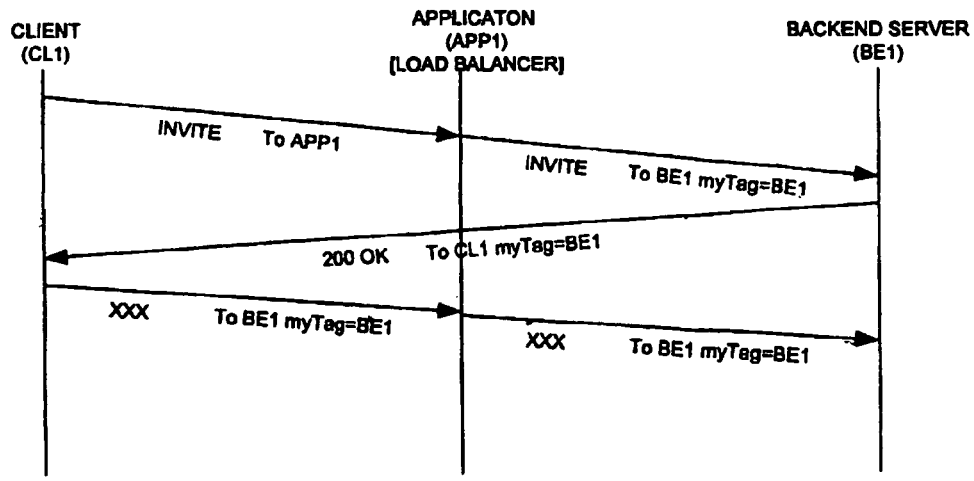
FIG. 6 is a message flow diagram illustrating a further embodiment.

The message flow diagram of FIG. 5 illustrates the way in which the retransmission of a SIP INVITE message may be handled by the load-balancer. A SIP user agent (CL1) sends a SIP INVITE message to the load-balancer (APP1). If the load-balancer determines that no inserted tag is present in the received message, for example if the message if the first message relating to a particular call identification, the load-balancer first searches its database to see if any entries have a matching call identification. If an entry is found this may indicate, for example, that the received message is a retransmitted message. The load-balancer retrieves the address of the backend server from the database, inserts a corresponding tag into the message, and forwards the message to the appropriate backend server.

If no matching entries are found this implies that the received message is the first message of a call and the message is processed as described above.

As described previously, a predetermined amount of time after the details of the first SIP message are stored in the database all entries having the corresponding call identification may be erased. In. this way, the database only contains context information for a given call identification for a maximum of 32 seconds.

A still further embodiment is illustrated with reference to FIG. 6. In this embodiment, the backend server Is adapted to respond directly to the SIP user agent. This is possible, for example, when the transport protocol used is user datagram protocol (UDP). Preferably the SIP message sent from the backend server is such that a response message sent from the user agent will be addressed to the load-balancer.

This is particular useful for fault tolerance purposes as the load-balancer maintains full control of the routing of messages, for example, in the event of a backend server failing.

Figure 7:
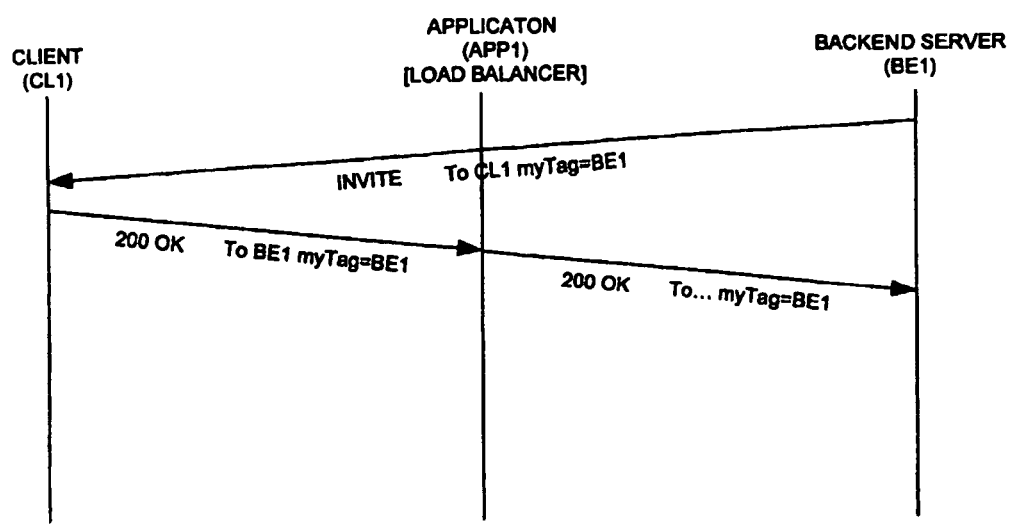
FIG. 7 is a message flow diagram illustrating a further embodiment.

In some circumstances, a backend server may initiate a call with a SIP use agent, as illustrated with reference to FIG. 7. In this embodiment, before sending the invite message, a tag is inserted in the message for enabling the load-balancer to later identify the backend server which initiated the call. Thus, when the SIP user agent sends a response message via the load-balancer, the load-balancer is able to determine which backend server to forward the message without requiring any context information to be stored at the load-balancer.

In such a system as described above the resource requirements of a load-balancer are no longer proportional to the number of established calls, since only the context information of newly established calls is required to be maintained by the load-balancer.

The invention claimed is:

1. A method of routing a message to one of a plurality of available processing systems, comprising the steps of:
    detecting for a presence of a destination identifier in the message; and
    when the presence of the destination identifier is detected, forwarding the message to a processing system identified thereby; and
    when the presence of a destination identifier is not detected:
    determining a destination processing system for processing the message;
    inserting into the message a destination identifier identifying the determined destination processing system without storing the destination identifier outside the message; and
    forwarding the message to the determined processing system.

2. A method according to claim 1, wherein each message further includes a message identifier for identifying related messages, the method further comprising maintaining a database of message identifiers for which no destination identifier was detected along with information indicating to which of the available processing systems each message was forwarded to.

3. The method according to claim 2, further comprising, where a message is received without a destination identifier, searching the database for a related message identifier and, where found, forwarding the message to the processing system identified therein.

4. The method according to claim 1, wherein each processing system is configured to send a response to the message originator via the load-balancer.

5. The method according to claim 1, wherein each processing system is configured to send a response directly to the originator of the message.

6. The method according to claim 2, further comprising removing entries in the database after a predetermined amount of time.

7. The method according to claim 1, for use in a session initiation protocol (SIP) based network.

8. The method according to claim 7, wherein the step of inserting further comprises inserting the destination identifier into an extension header of a SIP message.

9. The method according to claim 7, wherein the step of removing entries removes entries after 32 seconds.

10. The method according to claim 1, configured for use with the user datagram protocol (UDP).

11. The method according to claim 1, configured for use with a load-balancing element.

12. A load-balancing system for routing a message to one of a plurality of available processing systems, comprising:
    a load-balancing hardware server operating a message analyzer for detecting for a presence of a destination identifier in the received message;
    a message forwarder for forwarding the message to a processing system identified by the detected destination identifier in a received message; and
    a load analyzer for determining a destination processing system for processing the message when the presence of a destination identifier is not detected in the received message; and
    a message processor for inserting into the message a destination identifier identifying the determined destination processing system without storing the destination identifier outside the message.

13. A load-balancing system according to claim 12, wherein each message further includes a message identifier for identifying related messages, and further comprising a database for storing details of message identifiers for which no destination identifier was detected along with information indicating to which of the available processing systems each message was forwarded to.

14. A load-balancing system according to claim 13, further comprising, when a message is received without a destination identifier, the system is programmed for searching the database for a related message identifier and for identifying to which processing system the message should be forwarded.

15. A load-balancing system according to claim 12, wherein each processing system is configured to send a response to the message originator via the load-balancer.

16. A load-balancing system according to claim 12, wherein each processing system is configured to send a response directly to the originator of the message.

17. A load-balancing system according to claim 12, wherein the database is removes entries after a predetermined amount of time.

18. A load-balancing system according to claim 12, configured for use in a session initiation protocol (SIP) based network.

19. A load-balancing system according to claim 18, wherein the message processor is inserts the destination identifier into an extension header of a SIP message.

20. A load-balancing system according to claim 18, wherein the predetermined length of time is 32 seconds.

21. A load-balancing system according to claim 12, for use with the user datagram protocol (UDP).

22. The hardware load-balancing element configured for use in accordance with claim 1.

* * * * *

UNITED STATES PATENT AND TRADEMARK OFFICE
CERTIFICATE OF CORRECTION

| | | |
|---|---|---|
| PATENT NO. | : 7,936,763 B2 | Page 1 of 1 |
| APPLICATION NO. | : 10/557405 | |
| DATED | : May 3, 2011 | |
| INVENTOR(S) | : Jerome Forissier et al. | |

It is certified that error appears in the above-identified patent and that said Letters Patent is hereby corrected as shown below:

In column 8, Claim 17, line 45, after "database" delete "is".

In column 8, Claim 19, line 51, after "processor" delete "is".

Signed and Sealed this
Third Day of January, 2012

David J. Kappos
*Director of the United States Patent and Trademark Office*